United States Patent [19]

Kindrick

[11] 4,331,706
[45] May 25, 1982

[54] COMPOSITE ZINC OXIDE COATING ON AN INERT PIGMENT CORE PRODUCT AND PROCESS

[75] Inventor: Robert H. Kindrick, Flossmoor, Ill.

[73] Assignee: The Sherwin-Williams Company, Cleveland, Ohio

[21] Appl. No.: 110,573

[22] Filed: Jan. 9, 1980

Related U.S. Application Data

[60] Division of Ser. No. 859,349, Dec. 12, 1977, Pat. No. 4,207,377, which is a continuation-in-part of Ser. No. 749,124, Dec. 9, 1976, abandoned.

[51] Int. Cl.³ .................. B05D 5/12; B32B 9/04; B32B 15/04
[52] U.S. Cl. .................. 427/74; 106/288 B; 106/296; 106/308 B; 252/301.6 F; 252/501.1; 423/592; 423/622; 427/215; 427/218; 428/404; 428/689
[58] Field of Search .............. 106/288 B, 296, 308 B; 252/501, 301.6 F, 501.1; 427/215, 217, 74; 428/404, 539, 689; 423/622, 592

[56] References Cited

U.S. PATENT DOCUMENTS

| 1,944,158 | 1/1934 | French | 106/296 |
| 2,210,087 | 8/1940 | Leverenz | 252/301.6 F |
| 2,956,861 | 10/1960 | Garlet | 423/592 X |
| 3,004,857 | 10/1961 | Merson et al. | 106/296 X |
| 3,028,250 | 4/1962 | Dunn | 106/296 |
| 3,072,495 | 1/1963 | Pitrot | 106/296 |

FOREIGN PATENT DOCUMENTS

| 629390 | 3/1962 | Belgium | 106/296 |
| 130893 | 4/1974 | Japan | 106/296 |

Primary Examiner—Thomas J. Herbert, Jr.
Attorney, Agent, or Firm—Stephen A. Littlefield; Robert E. McDonald; James V. Tura

[57] ABSTRACT

This invention relates to a novel composite pigment and method for its manufacture which comprises a finely-divided inert pigment as a core which has deposited on its surface a non-photoconductive grade of zinc oxide, the weight ratio of zinc oxide ranging from about 30% to about 80% of the total weight of the composite pigment and the composite pigment characterized by a specific surface in excess of about 10 square meters/gram. In rubber compounding, the composite pigment reduces the cost of the zinc essential to produce quality products and the composite pigment because it is itself photoconductive is of utility in photoconductive end uses.

4 Claims, 10 Drawing Figures

500X 5,000X 5,000X 5,000X 2,000X 1,000X

COMPOSITE ZINC OXIDE COATING ON AN INERT PIGMENT CORE PRODUCT AND PROCESS

This is a division, of application Ser. No. 859,349, filed Dec. 12, 1977 (now U.S. Pat. No. 4,207,377) which was a continuation-in-part of application Ser. No. 749,124, filed Dec. 9, 1976, now abandoned.

BACKGROUND OF THE INVENTION

1. Field of the Invention

The field of this invention comprises composite pigments and their manufacture and, more particularly, composite pigments containing zinc oxide.

2. Description of the Prior Art

The most pertinent prior art known to the Applicant is U.S. Pat. No. 3,028,250 to Dunn. It is distinguished in Examples 3 and 9 to 13. U.S. Pat. No. 3,004,857 to Merson and Dunn is also very pertinent, but only because it contains the same teachings of the above-mentioned Dunn patent and as such is also distinguished in the Examples.

U.S. Pat. Nos. 2,956,861; 2,898,191 and 1,944,158 are pertinent in that they disclose the preparation of zinc oxide from carbonates. None disclose or suggest, however, the composite pigment of the present invention.

U.S. Pat. No. 2,210,087 is pertinent in that it disclosed a method for making manganese activated zinc orthosilicate which included the steps of precipitating zinc carbonate and manganese carbonate on finely divided particles of silica and calcining the products in the temperature range of 900° C. to 1400° C. With the present invention orthosilicates are avoided since they inhibit the pigment's photoconductive properties.

Belgian Pat. No. 629,390 disclosed a composite pigment comprising zinc oxide deposited on a core of silica produced by melting and vaporizing zinc or zinc-bearing ore and depositing the resulting zinc oxide on finely divided particles of silica. Patentee does not disclose nor suggest, however, that the composite pigment is of photoconductive quality.

U.S. Pat. No. 3,674,476 disclosed a process for producing photoconductive zinc oxide powder by heating zinc hydroxide or basic zinc carbonate at a minimum temperature of 180° C. in the presence of water and under an elevated pressure of at least 1.2 atmospheres, but does not disclose nor suggest depositing zinc oxide on an inert core material.

U.S. Pat. Nos. 3,897,248; 3,802,880; 3,197,307; 3,155,504 and 3,060,134 are cited as background information regarding photoconductive pigments. None disclose nor suggest, however, the present invention.

U.S. Pat. No. 2,139,995 discloses a zinc compound precipitated on blanc fixe to form a composite pigment used in rubber compounding. It is not relevant to the present invention in that it specifies uncalcined zinc carbonate-hydroxide on the blanc fixe and indicates calcined compounds not effective. Barium sulfate appears to be an anomolous inert.

Japanese Pat. No. 130893/1974 is pertinent in that it discloses depositing basic zinc carbonate on the surface of solid particles. The resulting composite particle is said to have utility in the compounding of rubber. Patentee neither discloses nor suggests the subject invention, however. This is particularly evident in that it specifies a decomposition temperature below 600° C. stating that the coating is zinc hydroxide basic zinc carbonate or a mixture of them and is also non-crystalline. It is also stated to be non-photoconductive. Only where reaction between the zinc compound and a reactive core occurs does the surface area of the composite pigment exceed 5.8 square meters/gram.

U.S. Pat. Nos. 2,958,578; 2,325,737 and 1,999,573 are cited as background information regarding compounding zinc with rubber. None discloses nor suggest, however, the present invention.

SUMMARY OF THE INVENTION

The invention comprises a calcined composite pigment consisting of finely divided inorganic inert pigment or core material with a non-photoconductive grade of zinc oxide deposited thereon, the weight ratio of the zinc oxide ranging from 30% to 80% of the total weight of the composite pigment. The product composite pigment is photoconductive in that it has the capability of being able to accept an electrostatic charge and to dissipate said charge upon exposure to ultraviolet light. The pigment has application in various electrostatic printing operations. For example, it has been found to be particularly effective in decorating plastic substrates such as polypropylene. The pigment also has application in rubber compounding wherein its composite nature permits the use of less zinc oxide equally effectively or without loss in quality.

A novel feature of the invention is a composite pigment with photoconductive characteristics having as its individual components pigmentary grades of zinc oxide and silica that are per se non-photoconductive.

An object of the invention is to provide a pigment that can be competitive in the market place for both photoconductive and non-photoconductive applications. Other objects will become apparent from the description of the preferred embodiment.

DESCRIPTION OF THE PREFERRED EMBODIMENT

Figure 1:
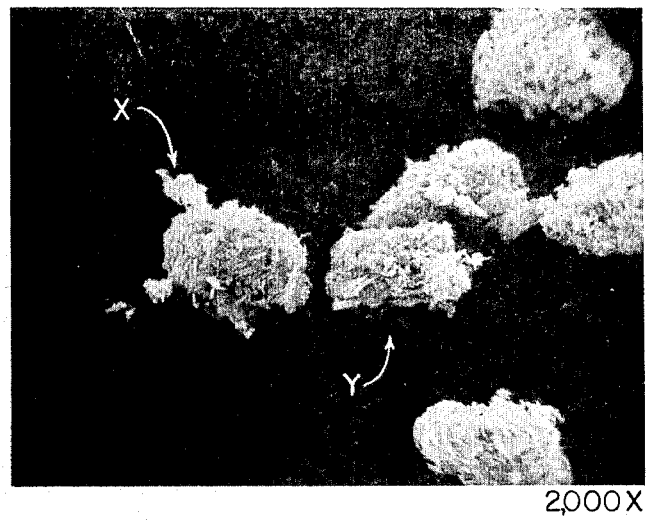
FIG. 1 is a photomicrograph taken with a scanning electron microscope (SEM) of pigment particles embodying the invention at a magnification of 2000X, i.e. one centimeter equals five microns.

French process zinc oxide, a pigment of high purity made by vaporizing zinc metal and oxiding the zinc with air, has many applications including that of a curing agent for various rubber formulations and a photoconductor for various electrostatic printing processes. Limiting factors with this pigment, however, include cost and the amount of energy required to produce it.

In an attempt to overcome these limitations, the feasibility of producing a composite pigment by depositing zinc oxide on cores of finely divided inert inorganic pigmentary particles, a significantly less expensive material, was studied. A result of this study was the discovery that not only was it possible to produce a composite pigment that had many of the properties of French process zinc oxide, it was possible to do so with a grade of zinc oxide that was less pure and per se, non-photoconductive.

This remarkable discovery has led to the development of a pigment that can be competitive in the marketplace in applications requiring either certain photoconductive or non-photoconductive grades of zinc oxide. For example, pigments embodying the invention have the property of being capable of accepting an electrostatic charge and dissipating said charge upon exposure to ultra-violet light. This property gives the invention application in various aspects of the electrostatic printing field. See Examples 4, 6 and 8. The pigment has also been found to be an effective rubber curing agent wherein the composite nature thereof enhances its utility by reduction in cost of materials, but does not hinder and in some instances enhances its effectiveness. See Examples 9 and 13. The pigment also has application in various coatings formulations as a corrosion inhibitor, stain blocking agent for waste base primers and among other things a crosslinking agent for acrylics. It can also be used in chemical reactions requiring high rates of reaction, the high rates being due to the pigment's relatively high surface area of in excess of 10 square meters/gram and the consequent relatively high amount of zinc oxide contacting the reactants. An example is a sulfur sorbent in pollution control equipment.

The invention comprises a composite pigment consisting of zinc oxide deposited on a finely divided inert inorganic pigment. It is characterized by the fact that the cores thereof are completely, or at least substantially covered by the zinc oxide. It is also characterized by the plate-like crystal structure of the deposited zinc oxide and the consequent relatively high surface area. See FIGS. 1, 4 and 6 and Example 3 and compare said FIGS. to FIG. 7.

The inert inorganic pigmentary core material as referred to herein includes the well-known class of inert non-opacifying pigments of the protective and decorative coatings art, but which are further limited to those chemically inert to the basic zinc ammonium carbonate solutions with which the core material is treated in the liquid phase and from which the zinc oxide coating is derived as is more fully shown herein. Included as illustrative of the class are silica, clay, calcium carbonate, talc, barium carbonate, etc.

A novel aspect of the invention is the pigment's photoconductive properties which result from starting materials that are per se non-photoconductive. See Examples 4, 6 and 8 and compare to Examples 5 and 7. As it is presently understood, the basis of this discovery is believed to be the difference in heat capacities, i.e. the quantity of heat necessary to raise the temperature of a unit volume one degree (specific heat X specific gravity), between the zinc oxide and silica. For zinc oxide, it is about 0.711 kilocalories/°C. gm. and for silica it is about 0.628 kilocalories/°C./gm. During the calcination step of the manufacturing process silicon bonds to the zinc oxide layer. This bonding induces (intersitial or chemi) absorbed oxygen at the interface of the zinc oxide and silica which is believed to be the cause of the pigment's photoconductive properties.

Figure 6:
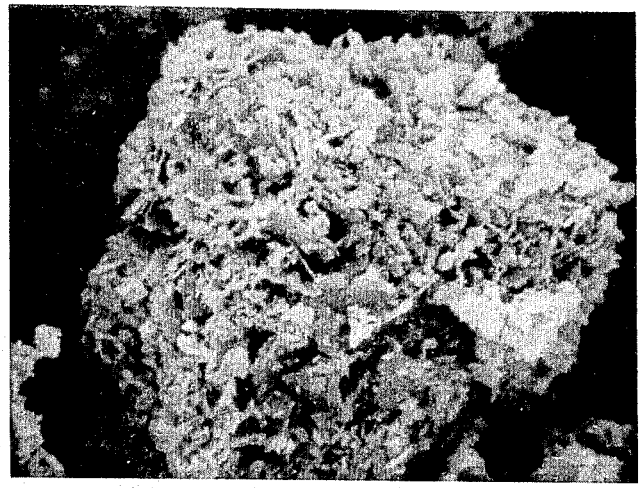
FIG. 6 is a photomicrograph taken with an SEM of a pigment particle embodying the invention at a magnification of 5000X, i.e. one centimeter equals two microns.

In consequence, so long as light is able to reach the zinc oxide-silica interface, the pigment will be photoconductive. The transmission of 360–385 nm wavelength light (U.V. or black light), for example, through zinc crystals that about are nine microns thick is known to be about 5% to about 20%. See for example "Zinc Chemicals" by Marie Farnsworth and Charles H. Kline, Zinc Institute, Inc., 292 Madison Avenue, New York, N.Y. particularly at FIG. 2.4; and "Zinc Oxide Rediscovered," prepared by Harvey E. Brown, The New Jersey Zinc Company, 160 Front Street, New York, N.Y. at page 22, Table 2. Photomicrographs of pigments embodying the invention having a 50.9% zinc oxide content indicate that although the zinc oxide layer varies in smoothness and overall character, its thickness is generally less than about five microns and thereby permits sufficient light to contact the interface to render the pigment photoconductive. See FIGS. 1 and 6 compare to FIG. 7.

The weight ratio of the zinc oxide can range from about 30% to about 80% of the total weight of the pigment, the exact ratio depending on desired properties and intended application. For example, as the invention is presently understood, it appears that optimum photoconductive properties are present when the ratio is about 50%. Beyond a ratio of about 80%, however, the zinc oxide layer appears to be too thick to permit sufficient transmission of ultra-violet light to the zinc oxide-silica interface for the material to exhibit sufficient photoconductive characteristics. Below a ratio of about 30% there does not appear to be sufficient zinc oxide present in the pigment to completely, or at least substantially coat all of the inert cores. If the pigment is to exhibit photoconductive properties, it is important that at least the bulk of the inert cores be coated since said properties appear to depend upon interstital or chemi-sorbed oxygen at the zinc oxide-silica interface.

When using the pigment in the compounding of rubber, the ratio is dependent upon desired properties of the rubber formulation and in consequence the degree of activation required from the pigment. Since the inert pigment is a significantly less expensive material than zinc oxide, the use of lower weight ratios of the latter is generally preferable. Examples 9 to 13 demonstrate that a pigment with a 50.9% ratio of zinc oxide is comparable, and in many instances superior to French process zinc oxide when used in compounding rubber.

The surface area of the pigment product is dependent mainly upon the conditions under which it is calcined and the percentage of zinc oxide. It has been observed, for example, that a pigment with a 50.9% zinc oxide content that was calcined for one hour at 800° C. had a surface area of 13.225 square meters/gram. The silica core material that was employed had a surface area of only 1.162 square meters/gram. See Example 2.

While the invention has been generally described and illustrated using silica as the inert core, silica particles have been used varying considerably in specific surface area and average particle size. Useful silica pigments include as illustrative UCAR Silica having an average particle size of 0.1 micron and a surface of 110 square meters/gram, Carbosil M-17 of the same average particle size and a surface area of 303 square meters/gram and Aerosil 200 having a particle size of 0.01 micron and a specific surface area (BET) of 183 square meters/gram.

We have also found useful calcium carbonate having a surface area of 2.1 square meters/gram producing a $CaCO_3$ cored zinc oxide having a specific surface of 14.6 square meters/gram; talc cored ZnO where the talc had a 6.9 square meters/gram specific surface and the composite pigment 13.6 square meters/gram; $BaCO_3$ cored zinc oxide where the core material had a 1.62 square meters/gram and the composite pigment 11.82 square meters/gram; a clay cored product was produced by the proposed process having 26.3 square meters/gram where the pigment core clay was of the oxide of 23.0 square meters/gram. (All were produced by calcination @ 800° C. for one hour.) Oddly, blanc fixe or $BaSO_4$ as a core provided anomalous results. It has a surface area of 1.0 square meters/gram and the cored ZnO composite had a specific surface of only 0.5 square meters/gram. While the foregoing cores are broadly useful, we prefer the silica particles varying from about one square meter/gram to the colloided pigmentary forms as described, supra for the major purposes of this invention. It is further apparent from the data that the specific surface of the core material is not particularly controlling on the specific surface of the ultimate composite pigment. It will be observed that the operative inorganic pigmentary inert core material is also chemically inert to the zinc ammonia-ammonium carbonate aqueous solutions used in the process of manufacture of the composite pigments of this invention.

Lower calcination temperatures and/or shorter calcination time periods result in products with higher surface areas, and vice versa. Note that the crystal structure in FIG. 1 is partially sintered; had it been calcined at a lower temperature and/or for a shorter period of time, the sintered effect probably would have been reduced or eliminated and in consequence the surface area would have been greater.

As indicated above, the individual components of the pigment are grades of zinc oxide and inert pigmentary particles that are per se non-photoconductive. For example, zinc fume in the form of a finely divided powder, the by-product of a lead smelting process, and finely ground natural white crystalline silica of about 1 square meter/gram surface area have been found to be effective.

The preferred method of producing the pigment comprises the following steps:

(1) Washing zinc metal fume in a weak solution of ammonia-ammonium carbonate;

(2) Dissolving the washed fume in a solution of ammonia, carbon dioxide and water to form a zinc-ammonia-carbonate solution;

(3) Removing impurities from the zinc-ammonia-carbonate solution through addition of zinc dust;

(4) Mixing the inert pigmentary particles with the purified zinc-ammonia-carbonate solution, the amount of silica being dependent upon the desired zinc oxide to silica weight ratio of the end product;

(5) Precipitating basic zinc carbonate, $2ZnCO_3.3Zn(OH)_2$, on the inert pigment, preferably silica, extender by heating the mixture from step (4) at about 85° C. and a pressure of about 450 to 550 mm. Hg. absolute;

(6) Filtering the precipitate and then drying it at about 110° C. to about 120° C.; and (7) Calcining the precipitate to drive off carbon dioxide and water leaving zinc oxide deposited on the silica, the time and temperature being dependent on the end properties, particularly surface area, as discussed above.

To assure a reasonable rate of production, i.e. calcination step of about one hour, it has been found that the temperature should range between about 800° C. and 900° C. Temperatures below about 800° C. inhibit the total conversion of the basic zinc carbonate to zinc oxide which hinders the pigment's photoconductive properties. At temperatures above about 900° C. zinc silicate starts to form in appreciable quantities which also hinders the pigment's photoconductive properties.

Pigments embodying the invention have been found to be particularly useful in decorating plastic substrates such as polypropylene suitcases or molded car seat backs with the following method: A conductive coating is first applied to substrates that are non-conductive preferably by spraying or dipping. This coating is not necessary, however, if the plastic is pigmented with metallic fine powders or if the plastic resin is conductive. Next a photoconductive coating comprising a pigment embodying the invention and a suitable binder are applied to the substrate with conventional spray means or an electrostatic spray. Once this coating is dry, the substrate is placed under an enlarger in a location where ultra-violet light is absent.

The image to be printed is inserted in the enlarger and focused on the substrate. The enlarger light is then turned off. Next the substrate is grounded and exposed to a high voltage negative corona. The photoconductive coating is exposed to the image projected with an ultra-violet light to form a latent image on the substrate. The latent image is toned and then dried. A clear topcoat can then be applied to the substrate to protect the image.

Another use for the invention has been found in the compounding of rubber. French process zinc oxide and various grades of American process zinc oxide are well-known additives for rubber. They are used primarily as activating or acceleration agents. One of the problems inherent with their use, however, is that only a relatively small percentage of the zinc oxide used is effective and actually undergoes reaction with other components of the compounding mixture. This is due to the fact that the reactions take place principally at the surface of the pigment. In effect, the zinc oxide below the surface is wasted since it only functions as a reinforcing agent, a function that any non-reactive pigment, e.g. silica, can perform. The deficiency is magnified by the fact that zinc oxide is more costly than reinforcing, non-reactive type materials. The invention overcomes these problems by providing a composite pigment wherein due to its physical cored structure, less zinc oxide is required to accomplish the same or improved results for less cost. See Examples 9 to 13.

The following examples are intended to illustrate the invention, but are not presented as limitations upon the scope of the claims.

EXAMPLE 1

Crude zinc oxide in the form of a finely divided powder, the by-product of a lead smelting process, having the analysis disclosed below was calcined in a muffle furnace at 300° C. for 45 minutes:

Zn—69.6%
Pb—10.1
As—0.15
Sb—0.31
Cu—0.0036
Sn—0.13
Cl—0.06
Fe—0.026
$SiO_2$—0.09
$SO_3$—4.4

A leach solution consisting of 2600 ml of ammonium hydroxide (28% $NH_3$), 2275 grams of ammonium carbonate made up to 13 liters with water was also prepared.

1500 grams of the calcined product was mixed with 13 liters of the leach solution for 2 hours at room temperature and allowed to settle. The solution was filtered through a Buchner filter and the residue was washed with 300 ml of the leach solution and then 200 ml of water. The residue was dried at 100° C., and weighed and analyzed as follows:

| Weight: | | 196 grams |
| --- | --- | --- |
| Pb: | 74.5% | equal to 96.3% of the total Pb |
| Zn: | 0.3% | equal to 0.056% of the total Zn |
| As: | 0.1% | equal to 8.71% of the total As |
| Sb: | 2.1% | equal to 88.5% of the total Sb |

The filtrate was mixed with 1.5 grams of zinc dust to remove dissolved Pb, Cu, Ni, Cd, etc. and then filtered through another Buchner filter. The resulting product was a zinc-ammonium-carbonate solution with a volume of 13.5 liters and a zinc concentration of 77.5 grams per liter.

EXAMPLE 2

300 grams of finely ground pigmentary inert natural white crystalline silica were mixed with 2.5 liters of a zinc-ammonium-carbonate solution prepared as disclosed in Example 1.

The mixture was heated under a pressure of 455 mm Hg. absolute to precipitate basic zinc carbonate on the surfaces of the silica particles. The mixture was continuously stirred during precipitation with a magnetic stirrer. The temperature of the starting mixture was 30° C. and the final temperature, after precipitation was complete, was 90° C. Volume loss during precipitation was approximately 50% with ammonia, carbon dioxide and water being given off. When precipitation was complete the resulting slurry was filtered and the precipitate was dried at 110° C.

The dried precipitate was calcined at 800° C. for one hour to convert the basic zinc carbonate to ZnO and then hammermilled. The result was a composite pigment consisting of silica as a core material with ZnO deposited thereon having the following analysis and characteristics:

ZnO—50.9%
$SiO_2$—43.2
$SO_3$—0.055
Cu—0.0001
Mn—0.0005
Fe—0.0051
Cd—0.0001
As—0.033
Sb—0.036

The density at 24° C. was 28.7 lbs. per gallon and the particle size ranged from about 0.2 microns to over 25 microns. Surface area was determined by nitrogen absorption (BET Surface Areas) and found to be 13.225 square meters/gram; the surface area of plain silica, the type used above, was found by the same technique to be 1.162 square meters/gram. Calcination at lower temperatures gave higher specific surfaces as follows:

700° C.—15.1 $m^2$/gram
600° C.—19.6 $m^2$/gram
500° C.—27.4 $m^2$/gram
400° C.—40.6 $m^2$/gram

EXAMPLE 3

To examine the surface characteristics of pigment embodying the invention a sample hereinafter referred to as Sample A, was made according to Example 2 with the exceptions that (1) it was not hammermilled and (2) it was heated by steam injection rather than by indirect external means.

For comparative purposes other samples were also prepared as follows:

Sample B: Ground natural silica, the extender material used in Sample A.

Sample C: Extended zinc oxide prepared according to the teachings of U.S. Pat. No. 3,028,250 to Dunn. The pigment consisted of 50% by weight silica, the same type used to prepare Samples A and B, and 50% French process zinc oxide (New Jersey Zinc XX78). The materials were wet ball milled for 18 to 20 hours with a small amount of acetic acid, filtered, dried at 105° C. and calcined at 600° C. for two hours.

Sample D: A dry blended mixture consisting of 50% silica the same used in Samples A, B and C and 50% French process zinc oxide, the same used in Sample C.

A series of samples were prepared using silica pigments of very high surface area obtained from commercial sources as in the foregoing Sample A procedure particularly for use in rubber stocks as E, F and G.

Sample E: Aerosil 200 having a surface area of 183 $m^2$/gram and an average particle size of 0.01 micron was used as a core material to produce a final product calcined at 800° C. for 1 hour consisting of 75% $SiO_2$ and 25% ZnO which composite pigment had a surface area of 55.1 $m^2$/gram.

Sample F: Cabosil M-17 having a surface area of 303 $m^2$/gram and an average particle size of 0.01 micron was used as the core of a final composite pigment containing 75% $SiO_2$ and 25% ZnO, calcined 1 hour at 800° C. The final product had a surface area of 60.0 $m^2$/gram.

Sample G: Ucar Silica having an original surface area of 110 $m^2$/gram and an average particle size of 0.10 micron served as the core in a composite consisting of 50% $SiO_2$ and 50% ZnO calcined at 300° C. for 1 hour had a final specific surface area of 50.0 square meters/gram.

Sample H: A silica cored product was made as near as reproducible from Belgian Pat. No. 629,390 following claim 5, mixing powdered zinc metal with crystalline $SiO_2$ and calcining at 800° C. for 1 hour. The core had a surface area of 1.1 square meters/gram and the pyrogenic product a surface area of 6.0 $m^2$/gram.

Sample I: Following Example 1 of Japanese Patent 130983/74, using a temperature of 800° C. (as no decomposition temperature was given) after pyrolysis we were unable to remove all the $CaCl_2$ by washing. The final product analyzed to be 34% ZnO, 63.6% $SiO_2$, and 1.5% $Cl_2$. BET specific surface area 8.42 $m^2$/gram, the core silica material having an original specific surface of 1.1 $m^2$/gram. Below 500° C. amorphous ZnO is produced and as the temperature is increased the ZnO increases in crystallinity. We have found that calcination temperature also determines the structure of the ZnO crystals.

Figure 2:
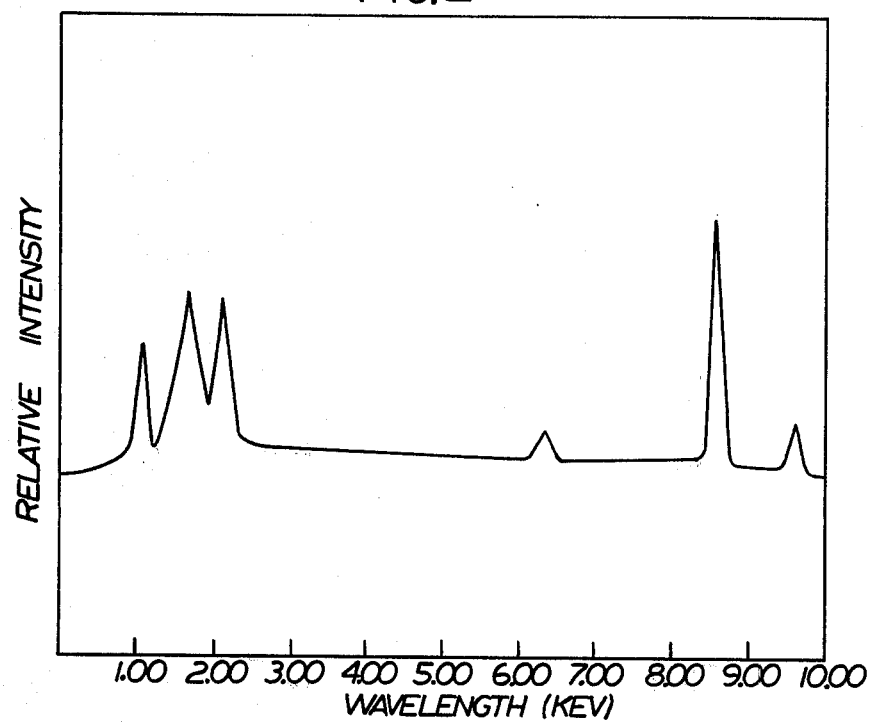
FIG. 2 is a draftman's reproduction of a spectra of wavelengths of X-rays produced by the exitation of particle X of FIG. 1 by the electron beam of the SEM using an energy dispersive, X-ray analyzer interfaced with the SEM.
Figure 3:
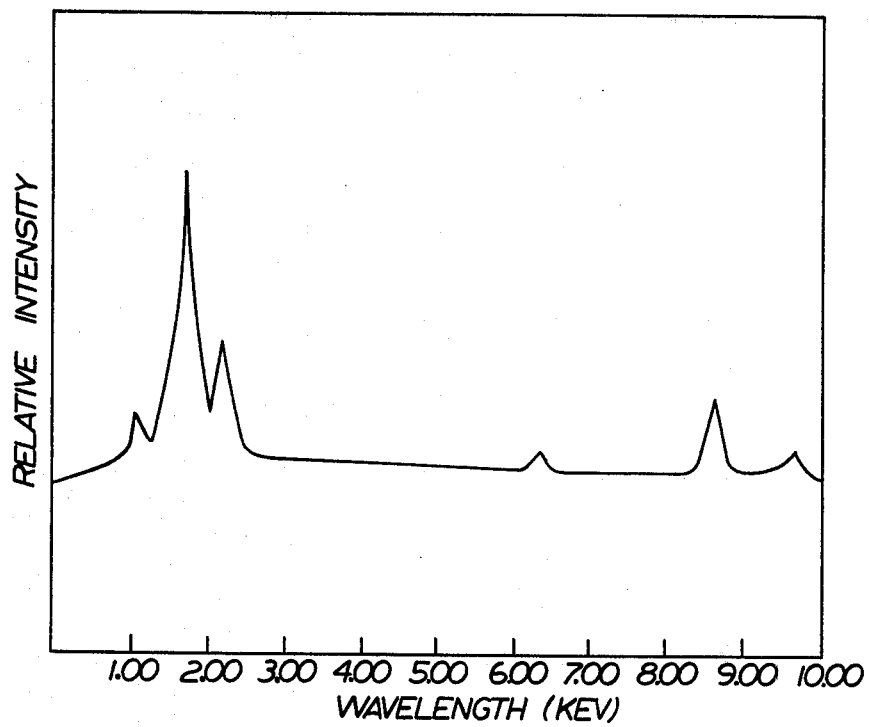
FIG. 3 is a draftman's reproduction of a spectra of wavelengths of X-rays produced by the exitation of particle Y of FIG. 1 by the electron beam of the SEM using an energy dispersive, X-ray analyzer interfaced with the SEM.

Photomicrographs, FIGS. 1 and 4 to 10, using a scanning electron microscope (SEM) were taken of the identified sample with the following results:

FIG. 1, Sample A at 2000X, shows several particles having a partially sintered, plate-like crystal structure. FIG. 2 and FIG. 3 are X-ray fluorescense spectras of particles X and Y, respectively of FIG. 1. A comparison of FIGS. 1, 2 and 3 indicate that both particles X and Y contain zinc and silicon and that particle X has a thicker coat of zinc oxide than does particle Y. It is also likely that both particles have occluded silica fines in the zinc oxide coating.

FIGS. 2 and 3 consist of spectras of wavelengths of X-rays produced by the exitation of the particles by the electron beam of the SEM. They were obtained using an energy-dispersive, X-ray analyzer interfaced with the SEM. The X-rays were produced by electron transitions in the inner orbits of atoms placed in a vacuum and bombarded by electrons within the SEM. The X-rays produced have characteristic energies or wavelengths that are dependent on the atom being bombarded and the transition involved. The energies in kiloelectron volts (KEV) observed in FIGS. 2 and 3 are disclosed below along with the particular element and transition involved. Interpretations are based on data disclosed in the "Handbook of Chemistry and Physics," published by the Chemical Rubber Co., 50th Edition, pages E-147, 143 and 156.

| Element | Transition | Wavelength (KEV) |
|---|---|---|
| Zn | $alpha_1, alpha_2 L_{III} M_{IV V}$ | 1.0117 |
|  | $alpha_2 KL_{III}$ | 8.615.78 |
|  | $alpha_1 KL_{III}$ | 8.63886 |
| Si | $alpha_2 KL_{II}$ | 1.73938 |
|  | $alpha_1 KL_{III}$ | 1.73998 |
| Au | $alpha_2 L_{III} M_{IV}$ | 9.6280 |
|  | $alpha_1 L_{III} M_V$ | 9.7133 |
|  | $alpha_2 M_V N_{VI}$ | 2.118 |
|  | $alpha_1 M_V N_{VII}$ | 2.1229 |
| Fe | $alpha_2 KL_{II}$ | 6.39084 |
|  | $alpha_1 KL_{III}$ | 6.40384 |

The Fe peaks disclosed in the spectras were due to the stainless steel sample holder. The Au peaks were due to the sample preparation technique. Since ZnO and $SiO_2$ are dielectric materials, they require the deposition of a conductive surface layer so that they can be observed at high resolution by the SEM. This necessitated coating the particles with thin layers of carbon and then gold by vacuum deposition.

Figure 4:
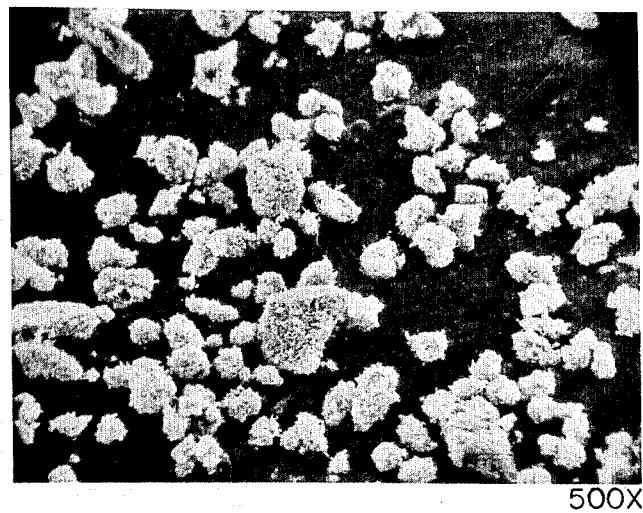
FIG. 4 is a photomicrograph of a silicon map field of pigment particles embodying the invention taken with an SEM at a magnification of 500X, i.e. one centimeter equals twenty microns.
Figure 5:
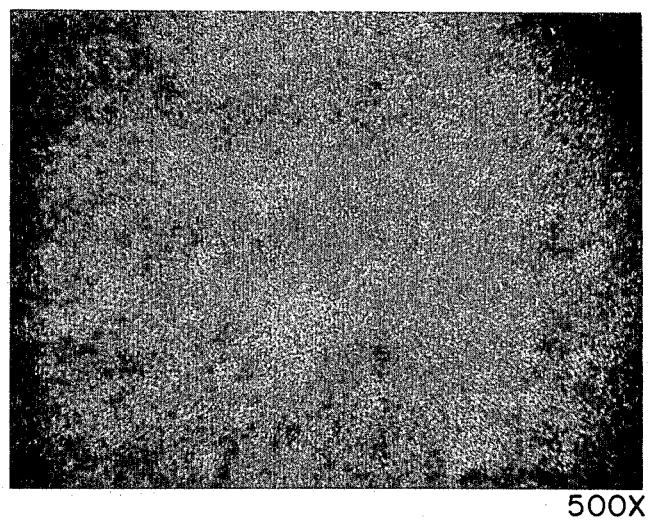
FIG. 5 is a photomicrograph of a silicon map of the field of FIG. 4 taken with an SEM at a maginfication of 500X.

FIG. 4 is a silicon map filled of Sample A at 500X and FIG. 5 is a silicon map at 500X of the field of FIG. 4. Concentrated dot patterns in FIG. 5 indicate the presence of silicon. FIG. 5 indicates that silicon is present in every particle or particle grouping of FIG. 4.

Figure 7:
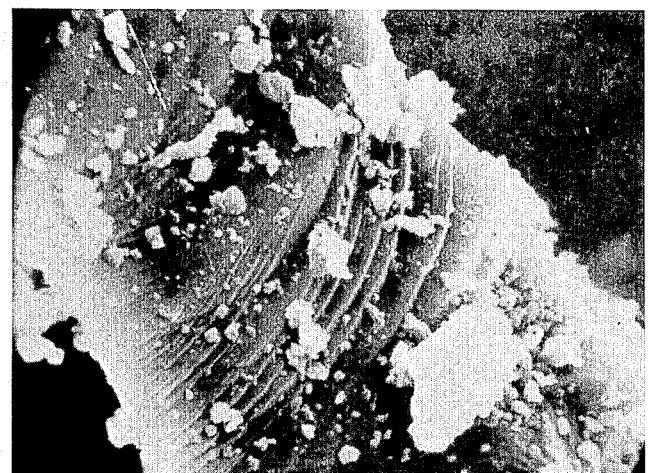
FIG. 7 is a photomicrograph taken with an SEM of particles of silica, the same type of silica used in the pigment depicted in FIGS. 1 and 4 to 6, at a magnification of 5000X.

FIG. 6, Sample A at 5000X, discloses more clearly the partially sintered, plate-like crystal structure disclosed in FIG. 1. FIG. 7, Sample B at 5000X, shows the bare extender silica with its smooth but fractured surfaces. A comparison of FIGS. 6 and 7 indicates that the exterior surface of Sample A consists completely, or at least substantially of zinc oxide.

Figure 8:
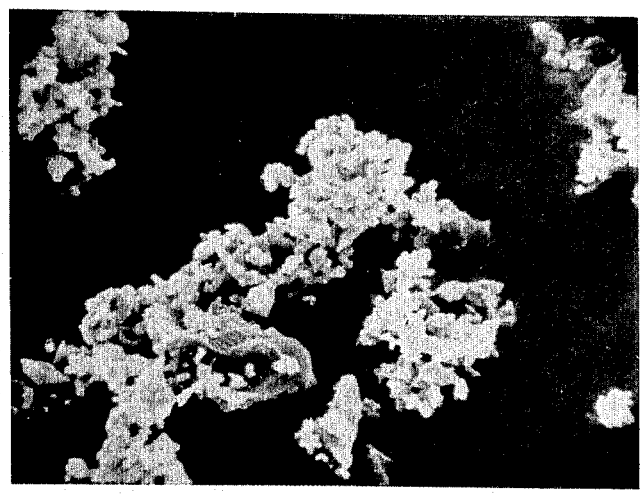
FIG. 8 is a photomicrograph taken with an SEM at a magnification of 5000X of zinc oxide-silica pigment particles made according to the teachings of U.S. Pat. No. 3,028,250.

FIG. 8, Sample C at 5000X, when compared to FIGS. 6 and 7 indicates an agglomeration of zinc oxide and silica particles, some of the large silica particles having surfaces that are almost totally bare and others being covered with agglomerated mixtures of zinc oxide and silica.

Figure 9:
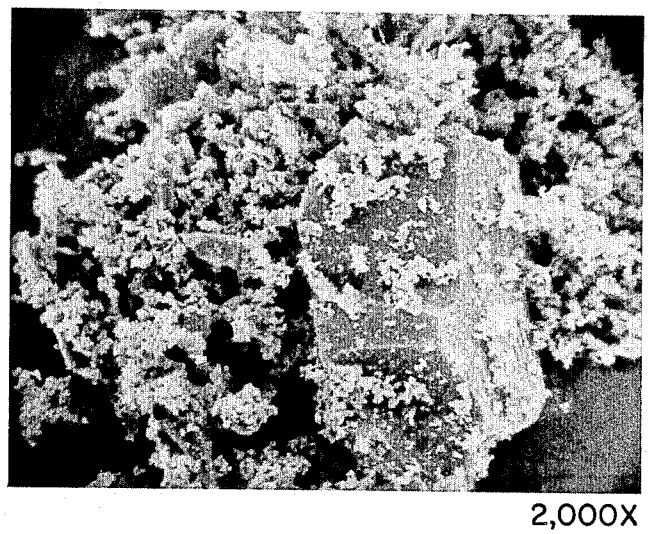
FIG. 9 is a photomicrograph taken with an SEM at a magnification of 2000X of zinc oxide-silica pigment particles made according to the teachings of U.S. Pat. No. 3,028,250.
Figure 10:
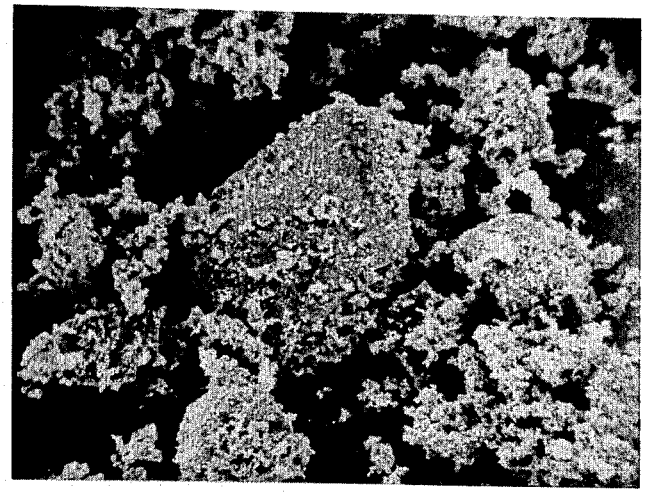
FIG. 10 is a photomicrograph taken with an SEM at a magnification of 2000X of a dry blend of zinc oxide and silica pigment particles.

FIG. 9, Sample C at 2000X, and FIG. 10, Sample D at 1000X, although at different magnifications, disclose products that are very similar, the only difference being the increased agglomeration that is evident in FIG. 9.

EXAMPLE 4

To test the photoconductive properties of the pigment of Example 2, the following coating formulation was prepared:

GE SR-82 Resin (Silicone resin manufactured by The General Electric Company having a 60% solids content)—10.4 grams
Toluene—41.8 grams
Pigment from Example 2—50.0 grams
Ceramic beads—150.0 grams The formulation was shaken for 30 minutes in an unlined can, filtered to remove the ceramic beads and stored overnight.

The next day, the coating was applied to a sheet of Kimberly-Clark KC 9518 conductive base paper at a thickness of about 1 mil with a wire wound "Mayer" rod. After the coating dried the paper was stored in a light tight black bag.

The coated paper was thereafter exposed to a corona charge of −15,000 volts. The spacing between the corona wire and the paper was 2¼ inches. The charge acceptance was measured with an electrometer at −36 volts. The dark decay over approximately four and one-half seconds was −16 volts and upon exposure to a 240 joule light flash the remaining charge was removed in 0.025 second. The normalized light decay, i.e. the ratio between the charge decay upon exposure to the flash and the charge the instant before the flash, was 1.0. The quality of the print made with this sample was very good; the lines of the reproduced pattern were sharp and there was very little background "noise".

EXAMPLE 5

2.5 liters of solution prepared according to Example 1 was filtered, dried at 110° C. and calcined at 800° C. for one hour to yield 241 grams of ZnO pigment.

To test the non-photoconductivity of this pigment the following coating formulation was prepared:
GE SR-82 Resin—10.4 grams
Toluene—41.8 grams
ZnO made according to this Example—50.0 grams
Ceramic beads—150.0 grams The formulation was shaken for 30 minutes in an unlined can, filtered to remove the ceramic beads and stored overnight.

The next day the photoconductivity of this sample was tested in the same manner as the sample of Example 4. The charge acceptance was −6.0 volts. The light decay under the 240 joules flash was −2 volts. The quality of the print made with this sample was very poor; the lines of the reproduced pattern were very faint and in some portions non-existent.

EXAMPLE 6

300 grams of finely ground natural white crystalline silica were mixed with 10 grams of sodium hydroxide and 1 liter of water and allowed to settle. After one hour the liquid layer was decanted off and the sediment was mixed with 2 liters of the zinc-ammonium-carbonate solution of Example 1. Precipitation and calcination were carried out under the conditions and procedures specified in Example 2 with the result being a composite pigment consisting of silica as a core material with ZnO deposited thereon, the pigment being 45% by weight ZnO and 55% silica. The specific surface area was about 13 m$^2$/gram.

To test the photoconductive properties of this pigment the following coating formulation was prepared:
  Styrene VT Soya Phthalate (An Alkyd Resin manufactued by The Sherwin-Williams Company consisting essentially of soya oil—13% by weight; styrene—11%; vinyl toluene—11%; naphta—50% and pentaerythritol phthalate—10%):—50 grams
  Pigment of this Example:—200 grams The coating was applied to a conductive base paper in the manner prescribed in Example 4. The coated paper was then stored in a black bag for 18 hours.

Next, the coated paper was charged with the corona unit of an Apeco office copier, Model No. 220, at a rate of 6.00 inches per second for 0.25 seconds. The charge acceptance was measured in the dark at −130 volts. Upon exposure to a 145 foot candle light from a tungsten-iodine, 420 watt lamp located approximately 3 feet from the paper surface, the charge dissipated completely in 0.025 seconds.

The charge acceptance was measured by charging the coated paper in the dark, placing the paper under a transparent electrostatic voltmeter probe on a grounded back electrode, and measuring the electrophotographic layer with light exposure. The probe was calibrated by placing a known voltage signal on the back electrode without having a paper between it and the voltmeter probe.

EXAMPLE 7

To test the photoconductivity of the silica used in Examples 2, 3, 4 and 6 the following coating formulation was prepared:
  Styrene VT Soya Phthalate—50 grams
  Silica—200 grams The formulation was applied to a conductive base paper and exposed to corona charge in the same manner as disclosed in Example 6 with the result that there was no charge acceptance.

EXAMPLE 8

125 grams of finely ground natural white crystalline silica were mixed with 3 liters of the zinc-ammonium-carbonate solution of Example 1. Precipitation was carried out under the conditions and procedures specified in Example 2. The precipitate was thereafter calcined at 800° C. for 1 hour and cooled in air at room temperature with the result being a composite pigment consisting of silica as a core material with ZnO deposited thereon, the pigment being 74% by weight ZnO and 26% silica. The specific surface area was 20.8 m$^2$/gram.

To test the photoconductive properties of this pigment the following coating formulation was prepared:
  Styrene VT Soya Gly Phthalate—50 grams
  Pigment of this Example—200 grams.

The formulation was applied to a conductive base paper and exposed to corona charge in the same manner as disclosed in Example 6 with the exception that the time of corona charge exposure was 2.5 seconds instead of 0.25 seconds. Charge acceptance was measured in the dark at −80 volts. Upon exposure to the 145 foot candle light referred to in Example 6 at a distance of 3 feet from the surface, the charge dissipated completely within 0.025 seconds.

EXAMPLE 9

To demonstrate the effectiveness of the invention as a rubber curing agent, two composite pigment formulations embodying the invention along with a control sample and two other pigment mixtures were prepared as follows:

Sample AA consisted of pigment embodying the invention prepared as disclosed in Example 2.

Sample BB was prepared in the same manner as Sample AA with the exception that prior to the filtering and drying steps the supernatent liquid, containing residual NH$_3$, was decanted off and then concentrated sulfuric acid was added dropwise until an endpoint pH of 6.8 was reached resulting in a layer of basic zinc sulfate on the surface of the pigment. The sulfuric acid was added at an ambient pressure and temperature with constant mixing over a one-hour period. The product was then filtered, dried, calcined for one hour at 800° C. and then hammermilled in the same manner as disclosed in Example 2.

Sample CC, the control sample, consisted of French process zinc oxide (XX78 manufactured by the New Jersey Zinc Company) which is listed as the National Bureau of Standards reference material 370d, a standard zinc oxide for rubber compounding.

Sample DD consisted of silica extended zinc oxide prepared according to the teachings of U.S. Pat. No. 3,028,250 to Dunn. The pigment was 50% by weight silica, the same type used in Samples AA and BB, and 50% French process zinc oxide, the same as used in Sample CC. The silica and zinc oxide were wet ball milled for 18 to 20 hours with a small amount of acetic acid, filtered, dired at 105° C. and calcined at 600° C. for two hours. The specific surface area was 3.8 m$^2$/gram.

Sample EE consisted of a dry blend of silica and zinc oxide that was 50% by weight silica and 50% zinc oxide. The zinc oxide was the French process type, the same as used in Samples CC and DD, and the silica was the same as used in Samples AA, BB and DD.

Each of the above samples were tested in the following steel-belted, breaker formulation, a typical compound used in the rubber industry:

| | PPH |
|---|---|
| Natural Rubber No. 1 RSS - Raw smoke sheet natural rubber | 85.0 |

-continued

| | PPH |
|---|---|
| Polybutadiene Cis 4 1203 (A sterospecific solution polymerized non-oil extended polybutadiene rubber with a Cis 1,4 content of approximately 93%) | 15.0 |
| Carbon Black ASTM designation N339 | 50.0 |
| Agerite Resin D (An amine antioxidant manufactured by Vanderbilt) | 1.0 |
| Circo light oil | 10.0 |
| Stearic acid | 2.0 |
| Resorcinol | 2.5 |
| Hexamethylene Tetramine | 1.6 |
| Santocure NOR (An accelerator 2-(Morpholinothio) benzothiazole) | 1.0 |
| Sulfur | 2.5 |

Samples AA to DD were tested at four different levels: 1.5, 3.0, 6.0 and 9.0 parts per hundred based on the rubber hydrocarbon content, i.e. natural rubber and polybutadiene.

All materials, with the exception of the curing agents and accelerators, were mixed in a Banbury mixer at 45 RPM. The temperature of the water to the rotors and jacket was 150° F. The batch temperatures reached 280° F. The mixing schedule:

| Time (Minutes) | Mixing Step |
|---|---|
| 0 | Deposit the natural rubber and polybutadiene in the mixer |
| 4 | Add stearic acid |
| 6 | Add Agerite Resin D |
| 8 | Add one half of the carbon black, and all of the Resorcinol and zinc oxide (Samples AA to EE as disclosed above) |
| 11 | Add the rest of the carbon black and the Circo light oil |
| 15 | Dump the ingredients |

The Santocure MOR and sulfur were added on the mill.

All stocks handled well in the Banbury and on the mill and all compounds molded well.

Significant properties of a rubber formulation affected by zinc oxide are stress-strain, cure rate and wire adhesion. To demonstrate the effectiveness of the invention in enhancing these properties, the tests disclosed in Examples 10 to 13 were performed.

EXAMPLE 10

ASTM D2084 was run under the following conditions for the samples prepared as disclosed in Example 9 using a Monsanto Rheometer and MPC dies to test the curing characteristics of the materials:
Temperature of test—287° F.
ARC used—3°
Frequency of oscillation—100 CPM
Preheat time—20 sec.
Chart time motor speed—60 min.

The test results:

| Pigment Sample | Pigment Level (PPH) | Minimum Torque (Torque-Lbs.) | Maximum Torque (Torque-Lbs.) | Scorch Time 2Pt. $tS_2$ (Minutes) | Cure Time % tc (90) (Minutes) |
|---|---|---|---|---|---|
| AA | 1.5 | 28.4 | 79.8 | 5.7 | 16.5 |
| | 8.0 | 27.4 | 92.6 | 5.8 | 18.0 |
| | 6.0 | 28.4 | 09.8 | 6.5 | 24.5 |
| | 9.0 | 27.6 | 99.8 | 6.4 | 24.8 |
| BB | 1.5 | 28.4 | 83.0 | 4.9 | 14.3 |
| | 3.0 | 28.8 | 98.0 | 5.7 | 19.0 |
| | 6.0 | 28.0 | 108.4 | 5.7 | 27.0 |
| | 9.0 | 27.6 | 111.6 | 5.5 | 29.0 |
| CC | 1.5 | 29.0 | 108.4 | 4.7 | 26.0 |
| | 8.0 | 27.4 | 103.8 | 5.3 | 26.0 |
| | 6.0 | 29.0 | 107.2 | 5.8 | 27.5 |
| | 9.0 | 29.0 | 110.0 | 5.8 | 29.0 |
| DD | 1.5 | 28.6 | 82.4 | 4.9 | 18.5 |
| | 3.0 | 28.6 | 91.4 | 5.5 | 18.0 |
| | 6.0 | 28.4 | 101.0 | 5.6 | 24.0 |
| | 9.0 | 28.0 | 102.4 | 5.6 | 25.5 |
| EE | 1.5 | 28.0 | 79.6 | 5.2 | 17.5 |
| | 3.0 | 27.6 | 92.8 | 5.3 | 17.9 |
| | 6.0 | 27.4 | 100.4 | 5.4 | 23.3 |
| | 9.0 | 28.0 | 102.2 | 5.6 | 24.6 |

Torque-Lbs. are a measure of torque related to the rheometer. Scorch time is the time required for the torque to increase by 2 torque-lbs. above the minimum torque. Cure time is the time required to reach 90% of the maximum torque.

The data indicates that pigment samples BB and the standard CC at the 6.0 and 9.0 pigment levels are equivalent to promoting vulcanization. At the lower levels sample BB is not as effective. At no level are samples DD and EE as effective as the control.

EXAMPLE 11

ASTM D412 was run on samples prepared as disclosed in Example 9 to test the unaged stress-strain characteristics of the materials. A Scott CRE tester was used and the tests were run at room temperature. Samples were cured at 287° F. to attain optimum cure and twice overcure. The time to attain optimum cure was determined by the rheometer test data disclosed in Example 10. Twice overcure was attained by curing the samples for twice the amount of time needed for optimum cure.

In the data below the values disclosed are median values for three test specimens.

The test data:

| Sample | Pigment Level (PPH) | Cure Time (Minutes) | Tensile, PSI @ 100% Strain | Tensile, PSI @ 300% Strain | Ultimate Tensile (PSI) | Elongation (%) |
|---|---|---|---|---|---|---|
| AA | 1.5 | 15 | 260 | 1500 | 3320 | 540 |
|  | 1.5 | 30 | 330 | 1810 | 3320 | 490 |
|  | 3.0 | 20 | 350 | 1980 | 3520 | 500 |
|  | 3.0 | 40 | 440 | 2180 | 3240 | 400 |
|  | 6.0 | 25 | 420 | 2120 | 3410 | 450 |
|  | 6.0 | 50 | 480 | 2420 | 3050 | 360 |
|  | 9.0 | 25 | 420 | 2130 | 3380 | 430 |
|  | 9.0 | 50 | 520 | 2400 | 3120 | 370 |
| BB | 1.5 | 15 | 340 | 1690 | 3560 | 530 |
|  | 1.5 | 30 | 370 | 1950 | 3450 | 480 |
|  | 3.0 | 20 | 450 | 2150 | 3600 | 480 |
|  | 3.0 | 40 | 450 | 2310 | 3330 | 410 |
|  | 6.0 | 25 | 450 | 2280 | 3450 | 450 |
|  | 6.0 | 50 | 530 | 2250 | 3220 | 380 |
|  | 9.0 | 30 | 480 | 2330 | 3280 | 400 |
|  | 9.0 | 60 | 540 | 2400 | 2970 | 370 |
| CC | 1.5 | 25 | 420 | 2140 | 3590 | 480 |
|  | 1.5 | 50 | 500 | 2430 | 3310 | 400 |
|  | 3.0 | 25 | 410 | 1970 | 3480 | 490 |
|  | 3.0 | 50 | 480 | 2330 | 3290 | 400 |
|  | 6.0 | 30 | 480 | 2220 | 3320 | 420 |
|  | 6.0 | 60 | 480 | 2350 | 3000 | 360 |
|  | 9.0 | 30 | 450 | 2230 | 3350 | 430 |
|  | 9.0 | 60 | 510 | 2420 | 2930 | 340 |
| DD | 1.5 | 20 | 300 | 1650 | 3200 | 520 |
|  | 1.5 | 40 | 300 | 1870 | 3130 | 480 |
|  | 3.0 | 20 | 380 | 1890 | 3300 | 480 |
|  | 3.0 | 40 | 430 | 2090 | 3310 | 440 |
|  | 6.0 | 25 | 410 | 2020 | 3430 | 470 |
|  | 6.0 | 50 | 570 | 2360 | 3130 | 400 |
|  | 9.0 | 25 | 420 | 1980 | 3240 | 460 |
|  | 9.0 | 50 | 500 | 2300 | 2950 | 370 |
| EE | 1.5 | 20 | 300 | 1650 | 3200 | 500 |
|  | 1.5 | 40 | 350 | 1870 | 3160 | 460 |
|  | 3.0 | 20 | 370 | 1950 | 3350 | 480 |
|  | 3.0 | 40 | 450 | 2190 | 3250 | 430 |
|  | 6.0 | 25 | 400 | 2100 | 3200 | 450 |
|  | 6.0 | 50 | 550 | 2370 | 3070 | 370 |
|  | 9.0 | 25 | 440 | 2100 | 3320 | 440 |
|  | 9.0 | 50 | 500 | 2370 | 3030 | 360 |

The data indicates that samples AA and BB are substantially equivalent, and in several instances superior, to the standard, sample CC, at all pigment levels except 1.5. In fact, the overall tensile properties of sample BB were the best of all the zinc oxides tested. Only at the high pigment levels, i.e. 6.0 and 9.0 and under twice overcure conditions did the tensile properties of samples DD and EE appear to be equivalent to the control; under said conditions samples AA and BB were at least equivalent, and in most instances superior, to samples DD and EE.

EXAMPLE 12

ASTN D573 was run on samples prepared as disclosed in Example 9 to test the aging characteristics of the materials. Again the Scott CRE tester was used, the tests being run at room temperature. The samples were cured at 237° F. and aged for 70 hours at 212° F. As in Example 11, samples were cured to attain both optimum cure and twice overcure.

As in Example 11, the data values given below represent median values for three test specimens. The percent change in ultimate tensile and elongation represent changes as compared to the respective data in Example 11.

The test data:

| Sample | Pigment Level (PPH) | Cure Time (Minutes) | Ultimate Tensile PSI | Ultimate Tensile % Change | Ultimate Elongation % | Ultimate Elongation % Change |
|---|---|---|---|---|---|---|
| AA | 1.5 | 15 | 1110 | −66.57 | 180 | −66.67 |
|  | 1.5 | 30 | 940 | −71.69 | 150 | −69.39 |
|  | 3.0 | 20 | 1500 | −57.39 | 180 | −64.00 |
|  | 3.0 | 40 | 960 | −70.37 | 130 | −67.50 |
|  | 6.0 | 25 | 1350 | −60.41 | 150 | −66.67 |
|  | 6.0 | 50 | 1080 | −61.59 | 120 | −66.67 |
|  | 9.0 | 25 | 1370 | −58.86 | 150 | −65.12 |
|  | 9.0 | 50 | 1110 | −64.42 | 120 | −64.85 |
| BB | 1.5 | 15 | 1170 | −67.13 | 180 | −66.04 |
|  | 1.5 | 30 | 980 | −71.59 | 150 | −68.75 |
|  | 3.0 | 20 | 1490 | −58.61 | 180 | −62.50 |
|  | 3.0 | 40 | 970 | −70.87 | 120 | −70.73 |
|  | 6.0 | 25 | 1250 | −63.77 | 140 | −68.89 |
|  | 6.0 | 50 | 1120 | −63.22 | 130 | −65.79 |
|  | 9.0 | 30 | 1200 | −63.41 | 140 | −65.00 |
|  | 9.0 | 60 | 1170 | −60.61 | 120 | −67.57 |
| CC | 1.5 | 25 | 1230 | −64.25 | 130 | −72.92 |
|  | 1.5 | 50 | 890 | −73.11 | 110 | −72.50 |
|  | 3.0 | 25 | 1200 | −65.52 | 140 | −71.43 |
|  | 3.0 | 50 | 1030 | −68.69 | 120 | −70.00 |
|  | 6.0 | 30 | 1180 | −64.46 | 130 | −69.05 |
|  | 6.0 | 60 | 1070 | −64.33 | 110 | −69.44 |
|  | 9.0 | 30 | 1320 | −60.60 | 130 | −69.77 |
|  | 9.0 | 60 | 980 | −66.55 | 110 | −67.65 |
| DD | 1.5 | 20 | 1020 | −68.13 | 170 | −67.31 |
|  | 1.5 | 40 | 850 | −72.84 | 130 | −72.92 |
|  | 3.0 | 20 | 1150 | −65.15 | 150 | −68.75 |
|  | 3.0 | 40 | 950 | −71.30 | 120 | −72.73 |
|  | 6.0 | 25 | 1180 | −65.60 | 130 | −72.34 |

-continued

| Sample | Pigment Level (PPH) | Cure Time (Minutes) | Ultimate Tensile PSI | % Change | Ultimate Elongation % | % Change |
|---|---|---|---|---|---|---|
|  | 6.0 | 50 | 1010 | −68.05 | 110 | −72.50 |
|  | 9.0 | 25 | 1200 | −62.96 | 130 | −71.14 |
|  | 9.0 | 50 | 1000 | −66.10 | 110 | −70.27 |
| EE | 1.5 | 20 | 970 | −69.69 | 170 | −66.00 |
|  | 1.5 | 40 | 750 | −76.27 | 140 | −69.57 |
|  | 3.0 | 20 | 1290 | −61.49 | 150 | −63.75 |
|  | 3.0 | 40 | 920 | −71.69 | 110 | −74.42 |
|  | 6.0 | 25 | 1330 | −53.45 | 150 | −66.67 |
|  | 6.0 | 50 | 1020 | −66.78 | 110 | −70.27 |
|  | 9.0 | 25 | 1340 | −59.64 | 150 | −65.91 |
|  | 9.0 | 50 | 870 | −71.29 | 100 | −74.29 |

The data indicates that both samples AA and BB proved to be at least equivalent and for the most part superior to the standard, sample CC. In every instance, sample AA underwent less change in ultimate elongation than did sample CC; sample BB experienced the same with one exception, i.e. at the 3.0 pigment level and twice overcure, wherein the results were virtually equivalent. With respect to change in ultimate tensile both samples AA and BB experienced less change than did sample CC in five of eight instances.

Samples DD and EE showed improvement over sample CC in ultimate tensile change in only three of eight instances. With utlimate elongation change sample DD showed improvement over sample CC in only two of eight instances while sample EE showed improvement over sample CC in four of eight instances.

EXAMPLE 13

ASTM D2229 was run for samples prepared as disclosed in Example 9 to test the strength of adhesion of the materials to brass plated steel wire. The samples were cured at 237° F. and tested in an unaged state and after aging at 212° F. for 70 hours. A brass plated steel wire having the dimensions 1×5×0.10 inches was used. The rate of travel of the power-actuated grips was 2 inches per minute. The data disclosed below comprise the result of 13 test specimens for each sample. The unaged test results were:

| Pigment Sample | Pigment Level (PPH) | Cure Time (Minutes) | Pull Out Force (Lbs.) Average | High | Low | Standard Deviation |
|---|---|---|---|---|---|---|
| AA | 1.5 | 25 | 65.3 | 71.9 | 50.3 | 5.86 |
|  | 3.0 | 30 | 90.6 | 101.2 | 82.0 | 5.13 |
|  | 6.0 | 35 | 90.2 | 101.6 | 79.1 | 6.22 |
|  | 9.0 | 35 | 85.5 | 100.0 | 77.0 | 5.83 |
| BB | 1.5 | 25 | 65.2 | 71.7 | 57.5 | 4.34 |
|  | 3.0 | 30 | 84.9 | 102.5 | 74.5 | 7.09 |
|  | 6.0 | 35 | 89.9 | 103.5 | 80.0 | 7.27 |
|  | 9.0 | 40 | 89.7 | 101.3 | 78.0 | 6.24 |
| CC | 1.5 | 35 | 74.6 | 91.1 | 59.2 | 8.91 |
|  | 3.0 | 35 | 79.5 | 96.0 | 69.0 | 9.71 |
|  | 6.0 | 40 | 89.6 | 101.0 | 72.0 | 7.00 |
|  | 9.0 | 40 | 88.5 | 101.7 | 75.0 | 7.03 |
| DD | 1.5 | 30 | 64.5 | 91.7 | 50.3 | 12.92 |
|  | 3.0 | 30 | 65.5 | 85.0 | 40.3 | 13.51 |
|  | 6.0 | 35 | 68.3 | 81.3 | 58.0 | 7.65 |
|  | 9.0 | 35 | 69.8 | 84.6 | 54.0 | 9.61 |
| EE | 1.5 | 30 | 48.6 | 53.2 | 36.8 | 6.08 |
|  | 3.0 | 30 | 69.7 | 79.0 | 60.5 | 6.30 |
|  | 6.0 | 35 | 72.8 | 91.1 | 62.0 | 8.26 |
|  | 9.0 | 35 | 74.9 | 35.0 | 60.6 | 8.22 |

The aged test results were:

-continued

| Pigment Sample | Pigment Level (PPH) | Cure Time (Minutes) | Pull Out Force (Lbs.) Average | High | Low | Standard Deviation |
|---|---|---|---|---|---|---|
| AA | 1.5 | 25 | 67.3 | 65.2 | 49.7 | 5.20 |
|  | 3.0 | 30 | 62.5 | 77.0 | 52.4 | 6.32 |
|  | 6.0 | 35 | 61.4 | 67.1 | 54.8 | 4.43 |
|  | 9.0 | 35 | 67.5 | 86.0 | 53.4 | 9.39 |
| BB | 1.5 | 25 | 59.6 | 77.7 | 52.4 | 6.57 |
|  | 3.0 | 30 | 59.8 | 70.7 | 48.0 | 6.69 |
|  | 6.0 | 35 | 64.2 | 78.8 | 55.9 | 6.24 |
|  | 9.0 | 40 | 58.8 | 69.4 | 50.0 | 5.25 |
| CC | 1.5 | 35 | 63.3 | 32.6 | 48.2 | 9.45 |
|  | 3.0 | 35 | 57.6 | 66.2 | 43.4 | 6.00 |
|  | 6.0 | 40 | 53.4 | 71.9 | 45.8 | 3.02 |
|  | 9.0 | 40 | 54.8 | 65.0 | 47.2 | 4.33 |
| DD | 1.5 | 30 | 50.3 | 63.9 | 38.5 | 8.65 |
|  | 3.0 | 30 | 59.2 | 93.0 | 41.2 | 13.33 |
|  | 6.0 | 35 | 58.9 | 65.2 | 52.2 | 3.86 |
|  | 9.0 | 35 | 67.7 | 36.0 | 55.5 | 8.71 |
| EE | 1.5 | 30 | 46.1 | 52.6 | 38.4 | 3.90 |
|  | 3.0 | 30 | 61.1 | 70.0 | 50.3 | 6.41 |
|  | 6.0 | 35 | 65.8 | 72.0 | 55.0 | 4.93 |
|  | 9.0 | 35 | 58.2 | 67.7 | 50.2 | 5.13 |

Sample AA, both aged and unaged, at all levels except 1.5 performed better than the control, Sample CC. The standard deviation in all cases except two was better than the control. In both instances, however, the retained adhesion was better than the control.

Sample BB, both aged and unaged, exhibited a higher retained adhesion at the 3.0, 6.0 and 9.0 levels than did the control and the standard deviation was better than the control in three of four instances with the unaged tests and in two of four instances with the aged tests.

Sample DD, aged and unaged, in six of eight instances had a higher standard deviation and in five of eight instances a lower retained adhesion than the control.

Sample EE, aged and unaged, had a lower retained adhesion in five of eight instances and a higher standard deviation in four of eight instances than did the control.

Examples 9 to 13 demonstrate the effectiveness of the invention with a steel-belted breaker formulation, a typical compound used in the industry. Sample AA of Examples 9 to 13 was also evaluated in (a) a typical passenger tread stock, (b) a black sidewall stock, (c) a passenger tire while sidewall stock and (d) a 100% natural rubber breaker stock. In each of these evaluations it was found to be on the whole at least comparable to two commercially acceptable grades of zinc oxide, one being French process zinc oxide, the same type that was evaluated in the above Examples, and the other being an American process zinc oxide, Actox 14 manufactured by the New Jersey Zinc Company. With each of these evaluations, approximately one-half the total amount of zinc oxide employed with the commercial grades was employed with Sample AA due to its composite structure.

(a) The Tread Stock Evaluation:

A polybutadiene-natural rubber blend was evaluated at the 1.6, 3.0 and 5.0 parts per hundred pigment levels. All stocks mixed and handled well in a Banbury mixer and on the mill. No difficulties were observed using Sample AA as compared to the two commercial grades.

ASTM D2084 was run using a Monsanto Rheometer with a 3° arc, a 60 minute motor and MPC dyes, at 100 cycles per minute and a temperature of 300° F. to evaluate the effectiveness of the pigments in activating cure. The result was that all of the maximum modulus values obtained were comparable for the three pigments and were within the experimental variation expected of the test.

ASTM D412 was run at room temperature on a Scott CRE tester at a rate of 20 inches per minute and a cure temperature of 300° F. to test the unaged stress-strain characteristics of the samples. Data obtained included 100% and 300% modulus under optimum and overcure conditions as determined by the rheometer. Also, ASTM D553 was run on optimum cured samples that were aged in hot air at 212° F. for 70 hours to test aged tensile and elongation. The data indicated that as the level of pigment increased, the modulus tended to increase as was expected. In two of three cases with Sample AA the loss in tensile strength and elongation upon aging was the least. In all other cases the stress-strain data for the various samples were comparable.

Flexometer data using ASTM D813 and rebound data using ASTM D1054 indicated that all of the compounds were fairly comparable.

(b) The Black Sidewall Stock Evaluation:

A polybutadiene-natural rubber blend that included a carbon black reinforcing system was tested at pigment levels of 3.0 and 5.0 parts per hundred. Rheometer and stress-strain tests run under same conditions as for the tread stock evaluation indicated that sample AA was at least comparable to the two commercial grades. The stress-strain data at optimum cure indicated that the French process zinc oxide samples tended to have higher modulus values, but the values for sample AA and the other commercial grade were within satisfactory levels.

(c) The Passenger Tire White Sidewall Evaluation:

A natural rubber-chlorobutyl rubber blend was evaluated at pigment levels of 3.0 and 5.0 parts per hundred. The blends were tested for cure rate and stress-strain in the same manner as for the tread stock evaluation. No significant differences were observed in the stress-strain data but the cure rate was slightly less for sample AA as opposed to the two commercial grades, although the maximum torque for all samples were comparable.

(d) The Breaker Stock Evaluation:

A 100% natural rubber compound was evaluated in the same manner as above at pigment levels of 5 and 10 parts per hundred. The cure rate which was tested as above with the exception that a temperature of 287° F. was used, indicated that there was no significant differences although Actox 14 performed the best by a slight margin with the unaged samples; sample AA was within acceptable limits, however, as were the French process samples.

ASTM D2229 using a $1 \times 5 \times 0.10$ inch brass plated steel wire at 2 inches per minute was run to test wire adhesion and indicated that all samples were comparable although Actox 14 at 5 PPH was slightly lower than the others.

While preferred forms and uses of the invention have been disclosed, other forms and uses as well as changes and improvements therein and thereon will occur to those skilled in the art who come to know and understand this invention, all without departing from the essence and substance thereof. Therefore, this patent is not to be restricted merely to that which is specifically disclosed herein, nor in any manner inconsistent with the progress by which it has promoted the progress of the art.

What I claim is:

1. A method of producing a composite pigment having a specific surface in excess of about 10 $m^2$/gram which comprises dissolving metallic zinc in an aqueous ammonia-ammonium carbonate medium to form a solution, dispersing an inert inorganic pigmentary core material in said aqueous complex zinc solution, precipitating a basic zinc carbonate deposit on said dispersed pigment by heating at below atmospheric pressure, calcining the precipitated zinc compounds on said inert pigmentary core at a Temperature not to exceed about 900° C. and for a time schedule sufficient to convert the precipitated basic zinc compounds to zinc oxide while avoiding the formation of a combined oxide of zinc and said pigmentary core material.

2. The process of claim 1 wherein the time-temperature schedule is not in excess of one hour and the temperature is within the range of from above 700° C. but less than 900° C.

3. The process of claim 1, where the inert pigmentary core material is silicon dioxide.

4. The process of claim 3 where the silicon dioxide has a specific surface in excess of one square meter per gram and the time-temperature calcination schedule is as in claim 2.

* * * * *